(12) United States Patent
Marini et al.

(10) Patent No.: US 8,641,049 B2
(45) Date of Patent: Feb. 4, 2014

(54) TOOL-LESS BLADE CLAMPING APPARATUS FOR A RECIPROCATING TOOL

(71) Applicants: Robert Bosch Tool Corporation, Broadview, IL (US); Robert Bosch GmbH, Stuttgart (DE)

(72) Inventors: Marc Vincent Marini, Elmhurst, IL (US); Vance E. Roe, Jackson, TN (US); Matthew Carr, Cambridge (GB); Gary Sinclair, Cheveley (GB); Gavin Wright, Wemyss Bay (GB)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/794,207

(22) Filed: Mar. 11, 2013

(65) Prior Publication Data

US 2013/0193653 A1    Aug. 1, 2013

Related U.S. Application Data

(63) Continuation of application No. 12/961,772, filed on Dec. 7, 2010, now Pat. No. 8,393,625, which is a continuation of application No. 10/760,110, filed on Jan. 16, 2004, now Pat. No. 7,871,080.

(51) Int. Cl.
*B23B 31/107* (2006.01)

(52) U.S. Cl.
USPC .......... 279/71; 279/74; 279/81; 279/82; 279/140; 30/339; 30/392

(58) Field of Classification Search
USPC .......... 279/71, 74, 75, 80–82, 140, 155; 30/329, 335–339, 392, 393; 83/699.21

IPC ........................................ B23B 31/107
See application file for complete search history.

(56) References Cited

U.S. PATENT DOCUMENTS

| | | |
|---|---|---|
| 3,583,716 A | 6/1971 | Daniel, Jr. |
| 3,750,283 A | 8/1973 | Hoffman |

(Continued)

FOREIGN PATENT DOCUMENTS

| | | |
|---|---|---|
| DE | 41 02 011 A1 | 12/1991 |
| EP | 0 792 713 A2 | 9/1997 |

(Continued)

*Primary Examiner* — Eric A Gates
(74) *Attorney, Agent, or Firm* — Maginot, Moore & Beck

(57) ABSTRACT

Several preferred embodiments are disclosed for a tool-less blade clamping apparatus for a reciprocating tool of the type which has a reciprocating plunger which has a tool attachment receiving slot for receiving a tool attachment of the type that has a shank portion. The clamping apparatus has an unclamped position and a clamped position. In the unclamped position, a tool attachment can be easily inserted and when it is in its clamped position, the tool attachment is securely retained. The preferred embodiments have at least one spring biasing the apparatus toward the clamped position, a releasable retaining mechanism for holding the apparatus in its unclamped position after being placed in that position. When the blade shank portion is inserted into the slot a predetermined distance, the shoulders of the shank portion release the retaining mechanism to move it to its clamped position. When a blade is to be removed, the clamping apparatus needs only to be moved to its unclamped position by manually rotating the outer sleeve or collar, and the blade is normally ejected from the mechanism by contact with the blade shoulders as it reaches its unclamped position.

14 Claims, 18 Drawing Sheets

(56) References Cited

U.S. PATENT DOCUMENTS

| | | | |
|---|---|---|---|
| 3,823,473 A | 7/1974 | Hoffman | |
| 3,927,893 A | 12/1975 | Dillon et al. | |
| 4,106,181 A * | 8/1978 | Mattchen | 29/450 |
| 4,299,402 A | 11/1981 | Hoffman | |
| 4,470,196 A | 9/1984 | Hoffman | |
| 4,601,477 A | 7/1986 | Barrett et al. | |
| 5,103,565 A | 4/1992 | Holzer, Jr. | |
| 5,306,025 A | 4/1994 | Langhoff | |
| 5,322,302 A | 6/1994 | Quirijnen | |
| 5,324,052 A | 6/1994 | Ortmann | |
| 5,340,129 A * | 8/1994 | Wright | 279/90 |
| 5,421,232 A | 6/1995 | Laverick | |
| 5,433,457 A * | 7/1995 | Wright | 279/90 |
| 5,443,276 A | 8/1995 | Nasser et al. | |
| 5,487,221 A | 1/1996 | Oda et al. | |
| 5,573,255 A | 11/1996 | Salpaka | |
| 5,575,071 A | 11/1996 | Phillips et al. | |
| 5,609,603 A | 3/1997 | Linden | |
| 5,647,133 A | 7/1997 | Dassoulas | |
| 5,661,909 A | 9/1997 | Kondo et al. | |
| 5,722,309 A | 3/1998 | Seyerle | |
| 5,724,742 A | 3/1998 | Grabowski | |
| 5,765,463 A | 6/1998 | Okubo et al. | |
| 5,794,352 A | 8/1998 | Dassoulas | |
| 5,810,367 A | 9/1998 | Holzer, Jr. et al. | |
| 5,848,474 A | 12/1998 | Fortney et al. | |
| 5,903,983 A | 5/1999 | Jungmann et al. | |
| RE36,269 E | 8/1999 | Wright | |
| 5,946,810 A | 9/1999 | Hoelderlin et al. | |
| 5,987,758 A | 11/1999 | McCurry et al. | |
| 5,988,034 A | 11/1999 | Okubo et al. | |
| 6,009,627 A | 1/2000 | Dassoulas et al. | |
| 6,023,848 A | 2/2000 | Dassoulas et al. | |
| 6,209,208 B1 | 4/2001 | Marinkovich et al. | |
| 6,237,231 B1 | 5/2001 | Jungmann | |
| 6,260,281 B1 | 7/2001 | Okumura et al. | |
| 6,276,065 B1 | 8/2001 | Osada et al. | |
| 6,295,736 B1 | 10/2001 | Dassoulas et al. | |
| 6,308,425 B1 | 10/2001 | Schumann | |
| 6,453,565 B1 | 9/2002 | Phillips | |
| 6,502,317 B2 | 1/2003 | Dassoulas et al. | |
| 6,612,039 B2 | 9/2003 | Kakiuchi et al. | |
| 6,725,548 B1 * | 4/2004 | Kramer et al. | 30/392 |
| 6,808,182 B2 * | 10/2004 | Lin | 279/74 |
| 6,851,194 B1 * | 2/2005 | Chen et al. | 30/392 |
| 6,877,751 B2 * | 4/2005 | Hsing | 279/14 |
| 7,040,023 B2 * | 5/2006 | Nemazi et al. | 30/392 |
| 7,107,690 B2 * | 9/2006 | Lui et al. | 30/392 |
| 7,251,897 B2 * | 8/2007 | Shuhua | 30/392 |
| 7,871,080 B2 * | 1/2011 | Marini et al. | 279/71 |
| 8,272,135 B2 * | 9/2012 | Zhou | 30/392 |
| 8,393,625 B2 * | 3/2013 | Marini et al. | 279/71 |
| 2002/0017026 A1 * | 2/2002 | Kakiuchi et al. | 30/392 |
| 2004/0035010 A1 * | 2/2004 | Kakiuchi et al. | 30/392 |
| 2004/0098870 A1 * | 5/2004 | Nemazi et al. | 30/392 |
| 2009/0273146 A1 * | 11/2009 | Dezheng et al. | 279/78 |

FOREIGN PATENT DOCUMENTS

| | | |
|---|---|---|
| GB | 1 484 393 | 9/1977 |
| GB | 1 597 240 | 9/1981 |
| GB | 2 173 734 A | 10/1986 |
| GB | 2 336 806 A | 11/1999 |
| GB | 2 338 205 A | 12/1999 |
| JP | 2000-117534 A | 4/2000 |
| WO | 89/08524 A1 | 9/1989 |
| WO | 95/27583 A1 | 10/1995 |
| WO | 97/31745 A2 | 9/1997 |
| WO | 03/099523 A2 | 12/2003 |

* cited by examiner

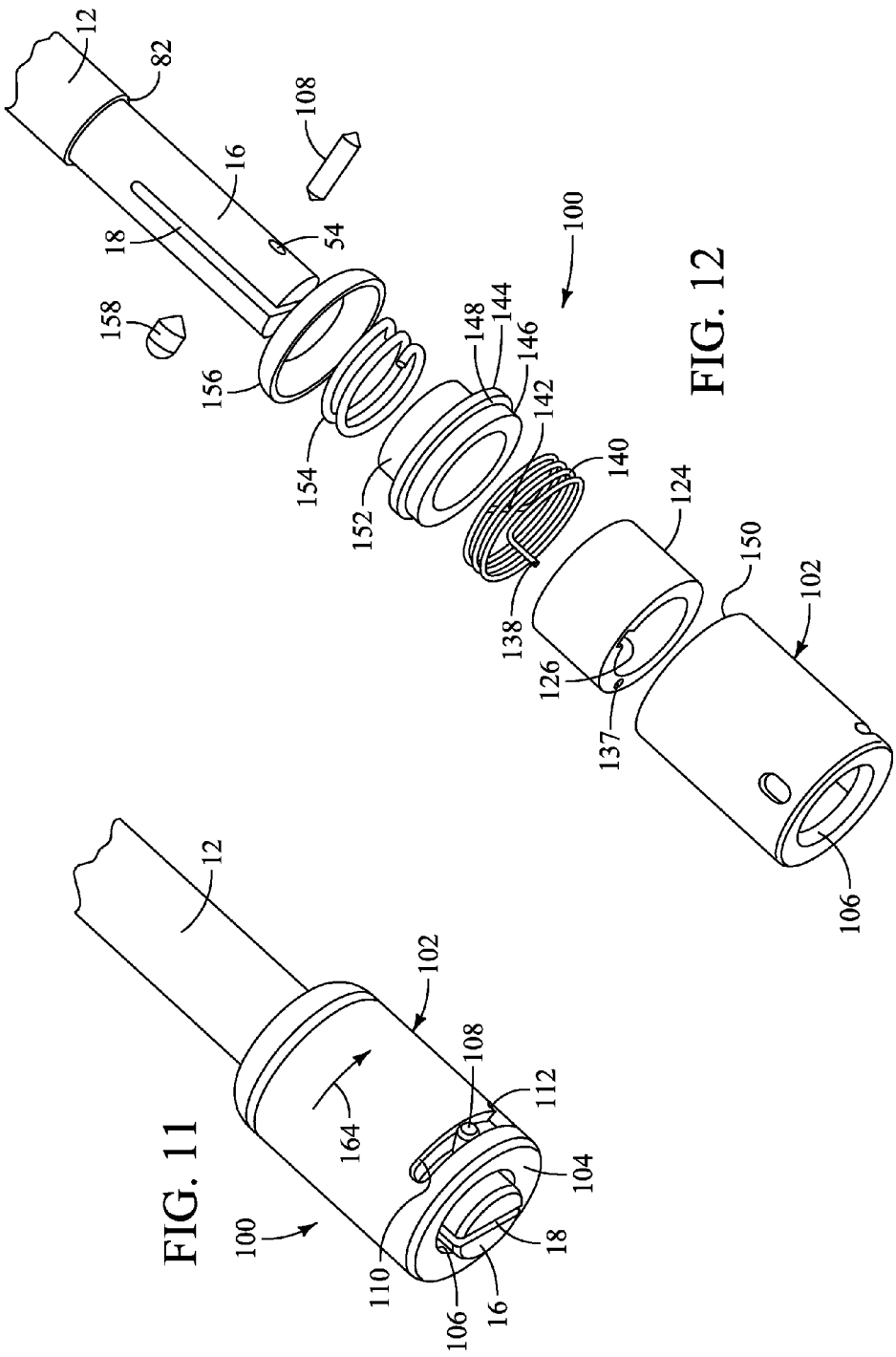

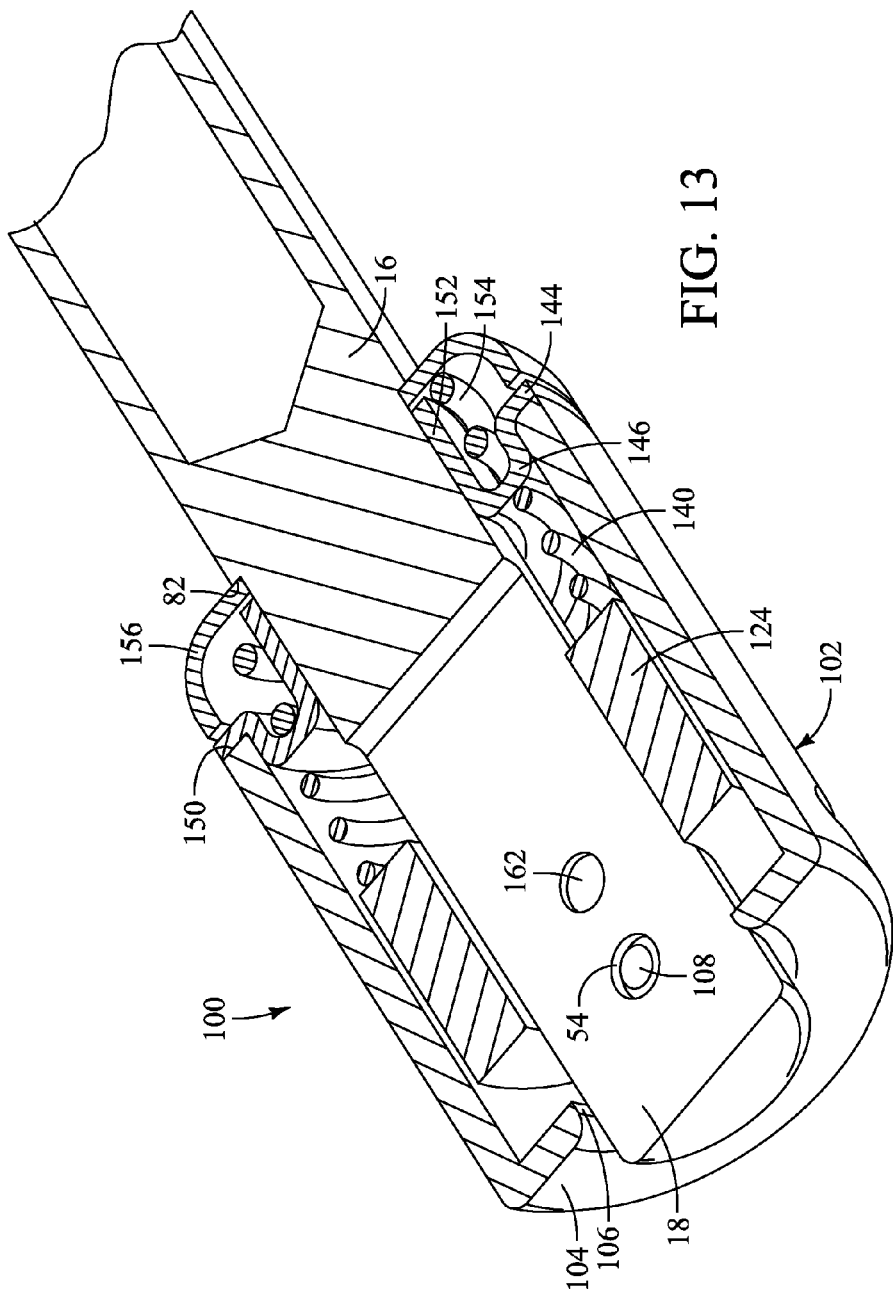

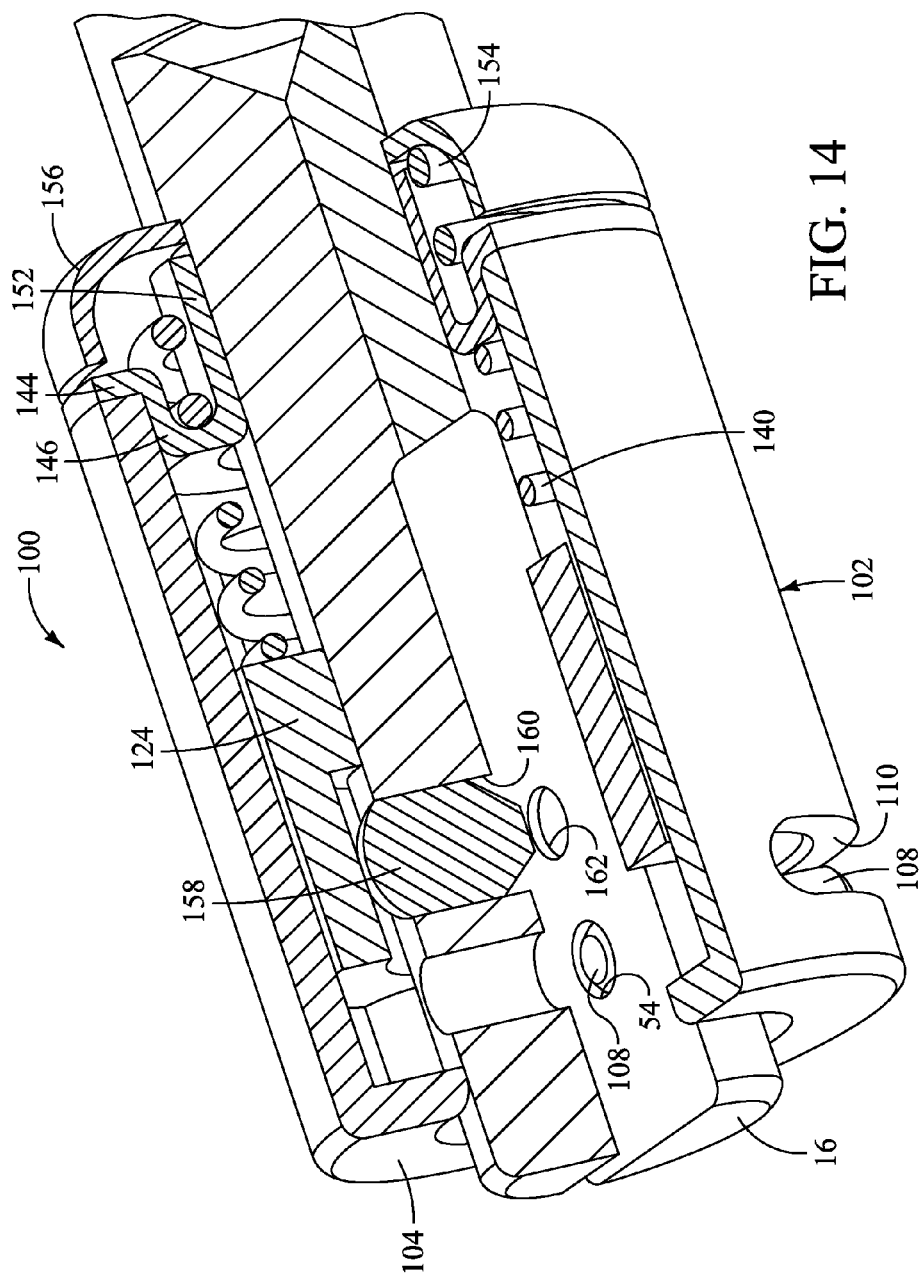

US 8,641,049 B2

TOOL-LESS BLADE CLAMPING APPARATUS FOR A RECIPROCATING TOOL

This application is a continuation of application Ser. No. 12/961,772, filed on Dec. 7, 2010 (now U.S. Pat. No. 8,393, 625), which in turn is a continuation of application Ser. No. 10/760,110, filed on Jan. 16, 2004 (now U.S. Pat. No. 7,871, 080). The disclosures of the two above-identified patent applications are hereby totally incorporated by reference in their entirety.

BACKGROUND OF THE INVENTION

The present invention generally relates to tools. More particularly, it relates to mechanisms for clamping tool attachments to such tools.

While reciprocating tools such as jigsaws, saber saws and other reciprocating tools, including medical and surgical instruments, have been used for decades, the mechanisms for attaching a tool attachment to the reciprocating portion has evolved from various attachment mechanisms that required separate tools of one kind or another, typically screwdrivers, wrenches or levers, to attach the tool attachment to a reciprocating member by tightening screws or the like. Because such attachment mechanisms are often located in a confined space in the tool, it is often inconvenient to attach or remove the tool attachment, which can comprise a cutting blade, a saw blade, an abrasive, polishing or smoothing member or the like from the tool. Moreover, since special tools were often required, it was necessary to have such tools available during use in the event the tool attachment breaks or otherwise needs to be changed because it is worn out or a different type of tool attachment is needed.

There has been a concerted effort in recent times to develop new kinds of attachment or clamping mechanisms that do not require the use of tools to mount and remove tool attachments from the tool. While mechanisms are known in the prior art that have this capability, the various known designs have varying degrees of effectiveness in securely holding the tool attachment in the tool, or in the ease and convenience of operation in mounting or removing tool attachments from the tool or in the degree of complexity and therefore cost of manufacture.

It is a continuing goal of designers to develop clamping mechanisms for such reciprocating tools which have superior design features, are effective to provide the desired amount of force to clamp the tool attachment, are easily operated, and have a minimum number of parts that are easily manufactured and assembled to thereby minimize the cost of manufacture.

SUMMARY OF THE INVENTION

Several preferred embodiments of the present invention are disclosed herein for a tool-less blade clamping apparatus for a reciprocating tool of the type which has a reciprocating plunger which has a tool attachment receiving slot for receiving a tool attachment of the type that has a shank portion with at least one, and preferably two shoulders spaced from the end of the shank and an aperture in the shank for facilitating holding by the clamping apparatus. In all of the disclosed preferred embodiments shown and described herein, the clamping apparatus has an unclamped position and a clamped position where the shank portion of the tool attachment can be inserted into the slot as well as an opening in the apparatus itself. In the unclamped position, a tool attachment can be easily inserted and the shoulders will release the apparatus to move to the clamped position, where the tool attachment is securely retained. When returned to the unclamped position, the apparatus engages the shoulders and pushes the blade from the apparatus.

The preferred embodiments have at least one spring biasing the apparatus toward the clamped position, a releasable retaining mechanism for holding said apparatus in its unclamped position after being placed in that position, such that when the retaining mechanism is released responsive to the blade shank portion being inserted into the opening and slot and the shoulders engage the apparatus and is thereafter moved a predetermined distance, the retaining mechanism is released to move to its clamped position. When a blade is to be removed, the clamping apparatus needs only to be moved to its unclamped position by manually rotating the outer sleeve or collar, and the apparatus pushes against the shoulders of the blade which causes the blade to normally be ejected from the mechanism as it reaches its unclamped position.

DESCRIPTION OF THE DRAWINGS

FIG. 11 is a perspective view of a second preferred embodiment of a clamping apparatus;

FIG. 12 is an exploded perspective illustrating the components of the apparatus shown in FIG. 11;

FIG. 13 is a perspective view of the apparatus shown in FIG. 11 shown in cross-section taken generally through the center of the apparatus along a plane parallel to the slot of the plunger rod;

FIG. 14 is a perspective view of the apparatus shown in FIG. 11 with portions removed to illustrate the relationship of components thereof;

DESCRIPTION OF THE PREFERRED EMBODIMENTS

Figure 1:
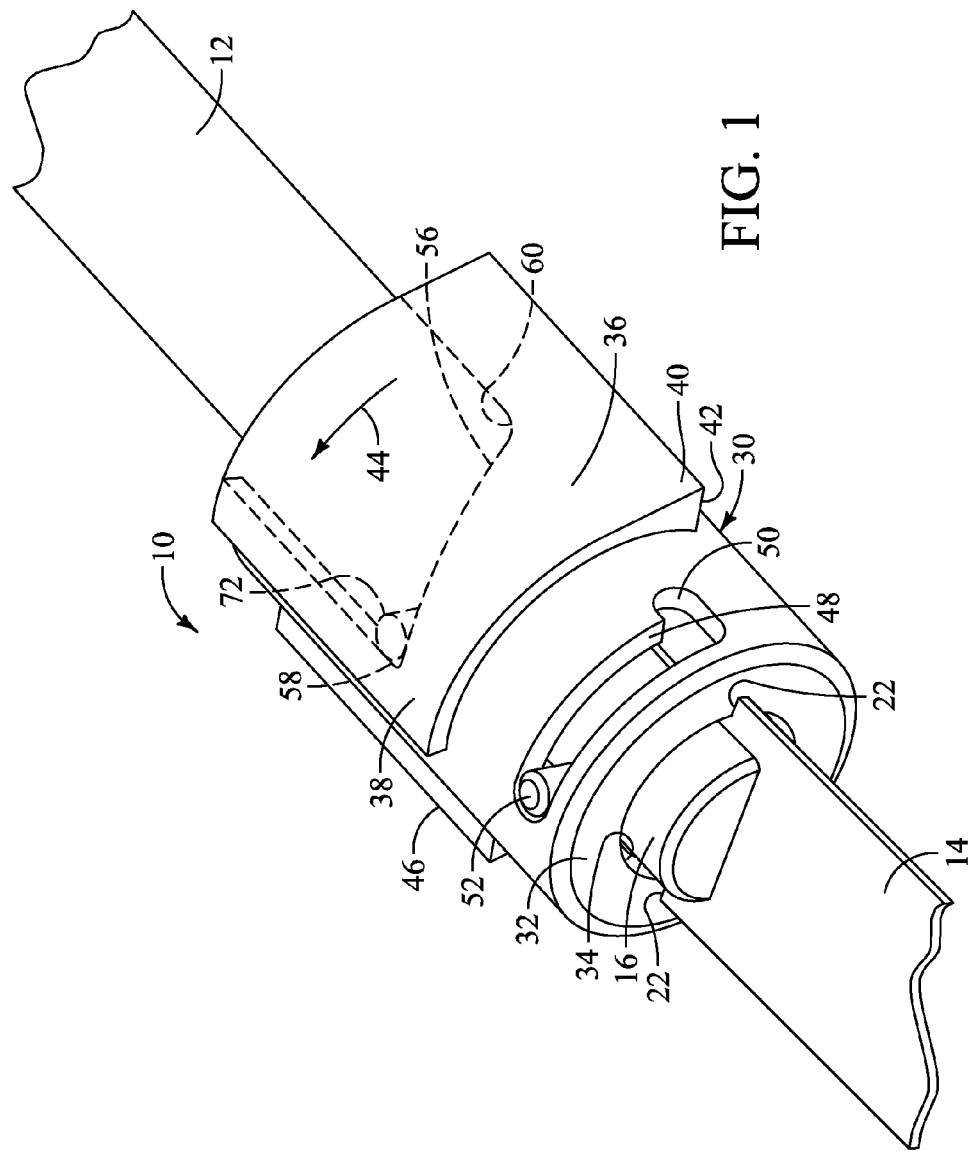
FIG. 1 is a perspective view of the first preferred embodiment of the clamping apparatus shown with a blade inserted in the apparatus in its clamped position.

While the various embodiments of the present invention can be used with various power hand tools jig saws, saber saws and other reciprocating saws used in the construction and woodworking applications, it should be understood that the clamping apparatus is certainly susceptible for use in applications other than these. It is contemplated that the clamping apparatus may be used in the medical field, particular with surgical instruments that are used with reciprocal saw and cutting blades. Also, while the embodiments of the present invention are particularly suited for use with power hand tools, they could be used with a nonpower hand tool as well as larger stationary power tools that employ tool attachments in a reciprocating manner and where such tool attachments are replaced. The detailed description of the preferred embodiments are described with regard to saber saws which use commercially available saw blades. The present invention should not be limited to the described applications.

The embodiments of the clamping apparatus of the present invention are particularly suited for use with a saber saw which has a generally cylindrical plunger rod although plunger rods or structure may be utilized which are other than the circular cross-section. However, if it is other than a circular cross-section throughout a significant part of its length, the plunger rod necessarily requires a generally cylindrical distal end portion in which the embodiments of the present invention are installed. The blade described herein in which the clamping mechanism of the embodiments of the present invention are to be used is of conventional design for saber saw blades, but it should be understood that the various embodiments could be modified to operate with other styles of blades if desired. The modification should be such that a hole be located somewhere on the shank portion of the blade and the blade should have at least one shoulder of the type described herein for releasing the apparatus from an unclamped position to a clamped position, and for ejecting the blade from the apparatus.

There are three preferred embodiments shown and described herein, with the first embodiment being illustrated in FIGS. 1 through 10, the second embodiment in FIGS. 11 through 15 and the third embodiment in FIGS. 16 through 22. A feature common to all embodiments is the aspect that the blade has at least one shoulder, and preferably two shoulders on opposite sides of the blade for engaging the apparatus during insertion of the blade in the apparatus. The shoulders contact the apparatus and release it which causes it to move to a clamped position. When it is desired to remove the blade, the apparatus is manually returned to its unclamped position and when it reaches that position the apparatus engages the shoulders and normally ejects the blade from the apparatus. This type of functionality is different from other prior art blade clamping mechanisms which utilize the end of the shank to cause the apparatus to move to the clamped position and also contact the end of the shank to remove it from the mechanism. The preferred embodiments of the present invention have an important advantage over this prior art mechanism in that the preferred embodiment can function with blades having shank portions of varying lengths. The insertion and ejection of the blade is achieved as a result of the shoulders in the shank portion of the blade and not the end of the shank.

With regard to the first preferred embodiment, the blade clamping apparatus is shown generally at 10 attached to a plunger rod 12 that is typically a part of a reciprocating power tool such as a saber saw or other reciprocating tool that is designed to use a removable or replaceable tool such as a cutting blade, saw blade or the like that is mounted to a plunger rod wherein the plunger rod has a reciprocating action. The clamping apparatus 10 is shown in FIG. 1 with a blade 14 clamped in place. The apparatus 10 is installed on the plunger rod 12 that extends to a reduced diameter end portion 16 which has a slot 18 (see FIG. 2), through which a shank portion 20 of the blade 14 is inserted.

Figure 5:
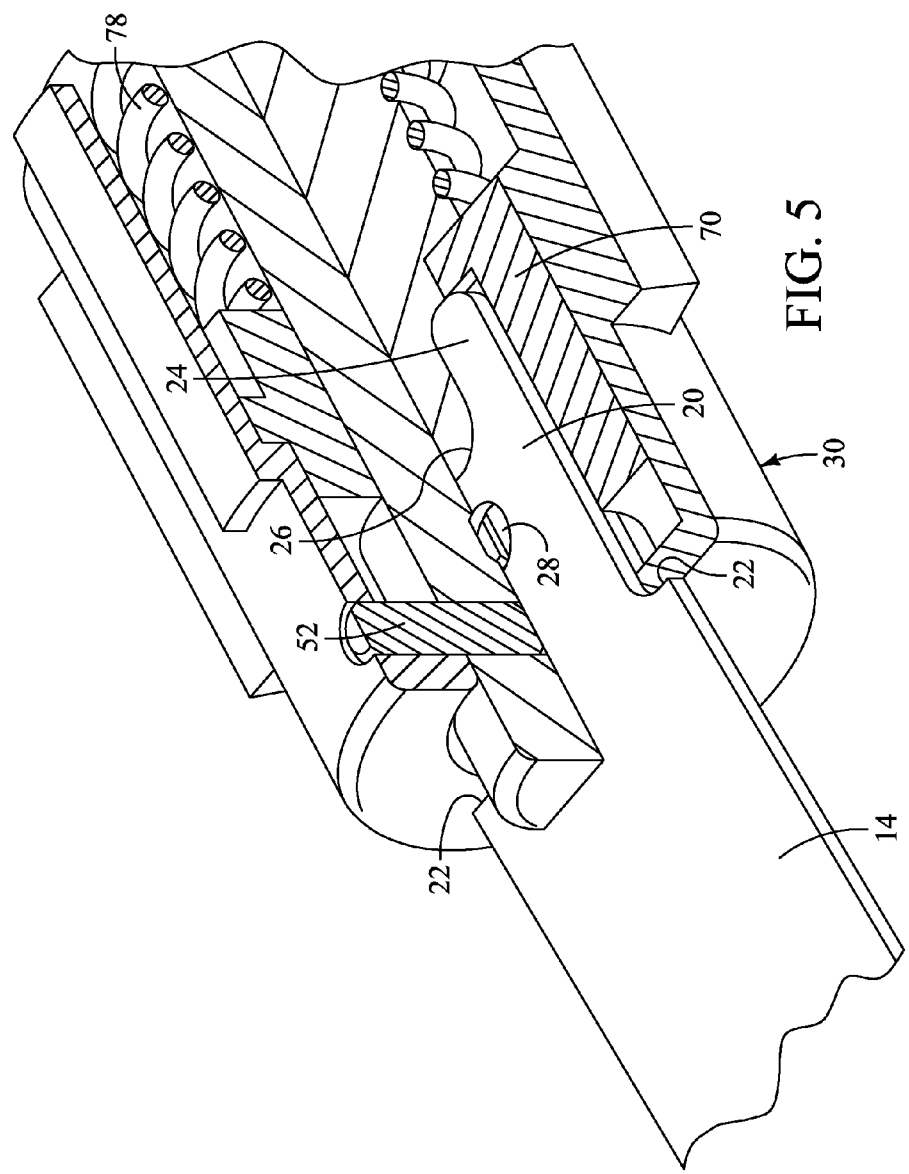
FIG. 5 is a perspective view with portions removed to illustrate many of the components of the apparatus shown in FIG. 1.

With regard to the shape of the blade 14 described herein, which is a generally typical shape and is commercially available from many manufacturers, it has a shank 20 that is generally of the same thickness as the blade portion 14 but is narrower than the blade portion in that the transition from the shank portion to the blade portion creates a shoulder 22 on each side of the blade. The end 24 of the blade 14 may have a notch 26 and the shank preferably has a hole 28 located in it center generally midway between the end 24 and the shoulder 22 in the longitudinal direction of the blade, all of which is shown in FIG. 5.

As shown in FIGS. 1-10, the apparatus 10 has an outer sleeve, indicated generally at 30, which has a generally hollow cylindrical configuration with a reduced diameter end wall 32 that has an opening 34 that is sized slightly larger than the diameter of the end portion 16 of the plunger rod 12 and also slightly larger than the width of the shank portion 20 of the blade 14 so that the shank portion can be inserted into the slot 18 of the rod end portion 16 and the opening 34. The outer sleeve 30 has a thickened portion 36 that has a generally square shape and increases from a relatively small thickness at end 38 and to a thicker portion at the opposite end 40, with a transverse end wall 42 providing a gripping surface for a user to more easily rotate the outer sleeve 30 in the counterclockwise direction indicated by the arrow 44 to place the apparatus in an unclamped position. A second thickened portion 46 is provided diametrically opposite the portion 36 for enabling symmetrically balanced gripping by a user.

Figure 2:
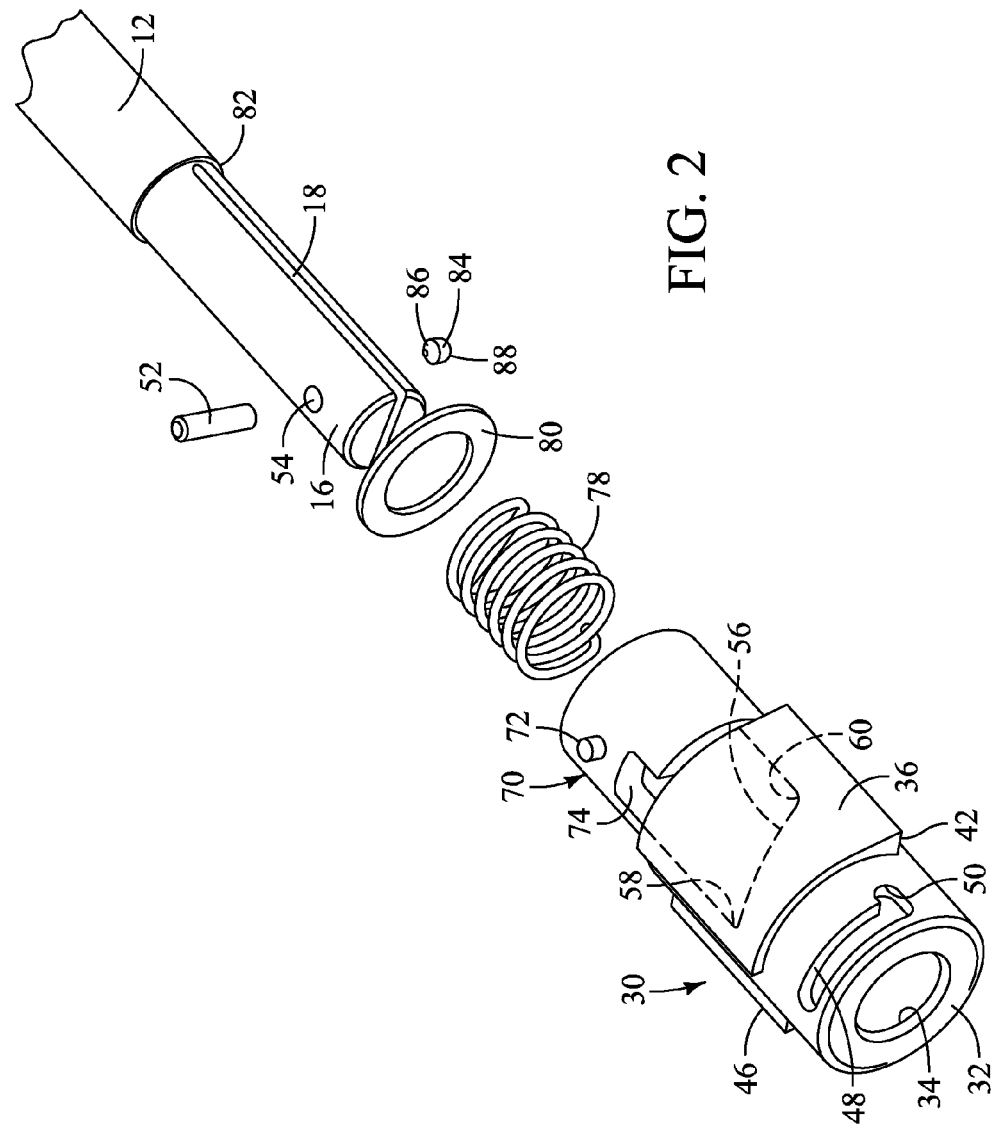
FIG. 2 is an exploded perspective illustrating the components of the apparatus shown in FIG. 1.
Figure 3:
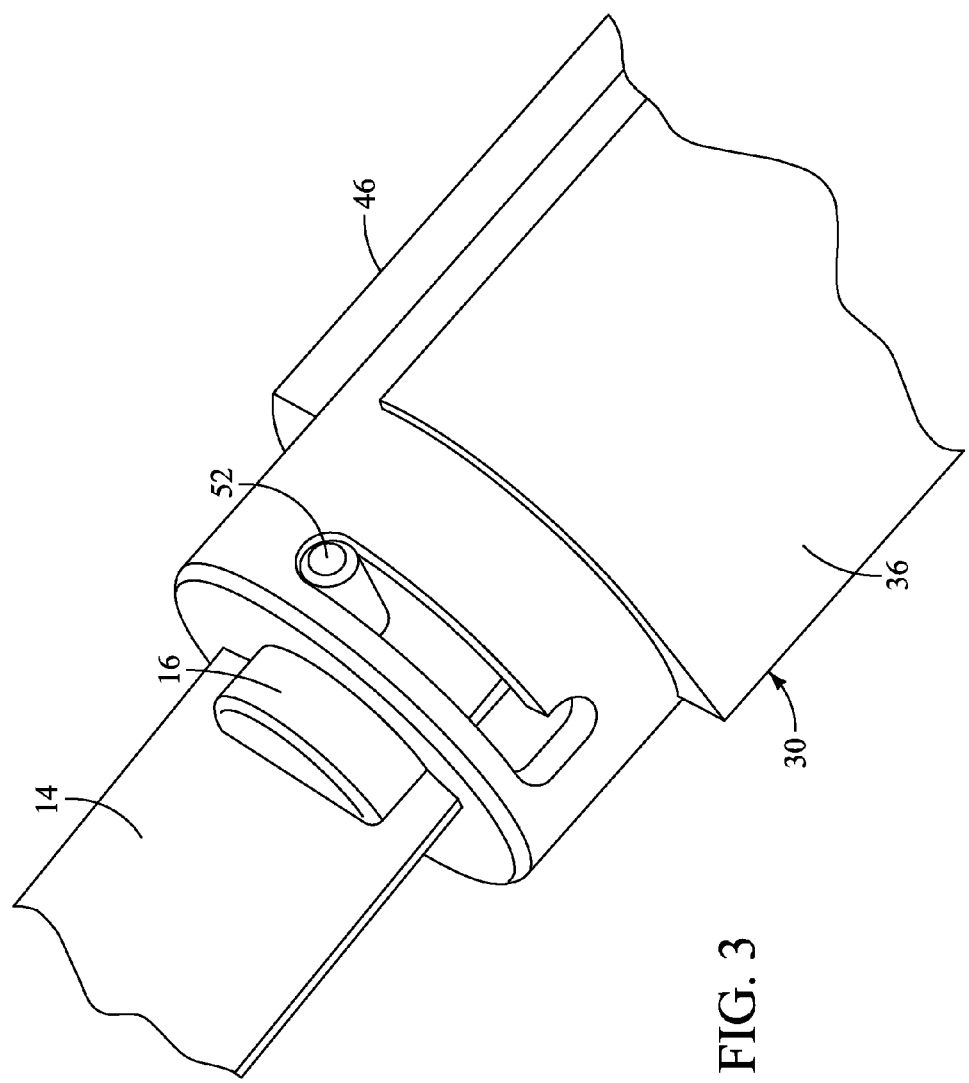
FIG. 3 is an enlarged perspective view illustrating a portion of the apparatus shown in FIG. 1.

The outer sleeve 30 has a circumferential elongated slot 48 with a transverse axially aligned extension 50 at one end thereof in which a forward pin 52 is preferably press fit into an opening 54 in the end 16 of the plunger rod 12. A diagonal wall 56 is defined by a recess in the inside of the outer sleeve, i.e., the left end portion 58 of the recess as shown in FIGS. 1 and 2 is closer to the front end wall 32 than the right end 60 of the recess. The wall 56 has a length that is approximately equal to the length of the slot 48 in that rotation of the pin 52 in the slot 48 extends through an arc that is preferably at least equal to the angular arc between ends 58 and 60 of the wall 56.

The apparatus also includes an inner sleeve, indicated generally at 70, which also has a hollow cylindrical configuration and an outer diameter that is sized to closely fit within the outer sleeve 30 and which has an inner diameter that is slightly larger than the outside diameter of the plunger rod end portion 16 on which it slides. The inner sleeve has a pair of protrusions 72 that are diametrically opposite one another and an axial recess 74 that extends from the front end rearwardly toward the upper protrusion 72. The width of the recess is approximately equal to the diameter of the pin 52 and the axial length of the recess 74 is approximately equal to the axial distance between the ends 58 and 60 of the groove 56. In this way, the inner sleeve 70 can move in the axial distance by an amount equal to the axial distance between ends 58 and 60, but is restrained from rotation by virtue of the pin 52 riding in the recess 74.

Figure 7:
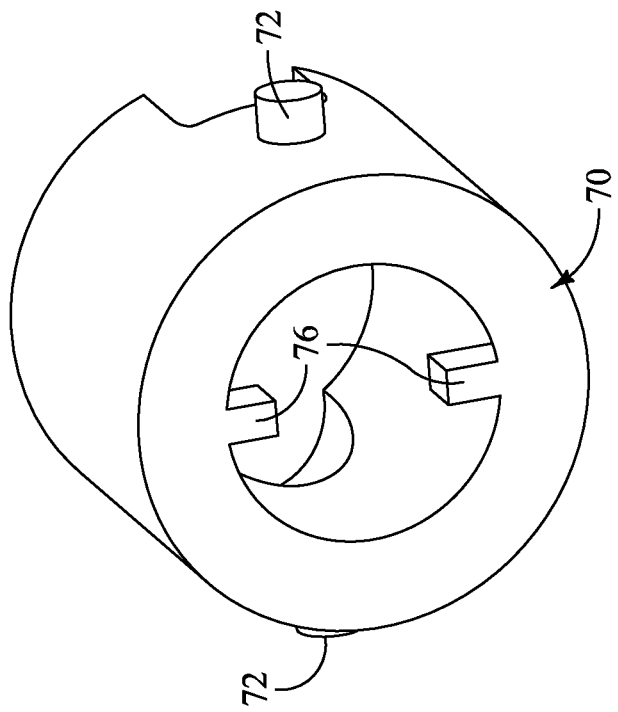
FIG. 7 is another perspective view of the inner sleeve shown in the apparatus of FIG. 1.

While not specifically illustrated, the outer sleeve 30 has a recess diametrically opposed to the recess defining the wall 56 that is virtually identical to it, but diametrically opposed. The protrusion 72 is adapted to fit within the recess defining the wall 56 and the opposite protrusion similarly engages the recess slot on the opposite side of the outer sleeve 30, so that when there is relative rotational movement between the inner sleeve and the outer sleeve, the angular orientation of the slot 48 will cause axial movement of the inner sleeve 70 relative to the outer sleeve 72. As is best shown in FIG. 7, the inner sleeve 70 also has a pair of radially oriented inwardly extending ribs 76 that are diametrically opposite one another that are configured to fit within the slot 18 of the end portion 16 of the plunger rod 12 which prevents rotational movement of the inner sleeve 70 relative to the outer sleeve or the plunger rod 12.

The apparatus also includes a compression spring 78 which bears against the inner sleeve 70 and against a spring retainer 80. The spring 78 has an inside diameter that is slightly larger than the end portion 16 of the plunger rod so that it fits over the same. The spring retainer 80 has an inside diameter that is only slightly larger than the outside diameter of the end portion 16 and slides on it until it reaches an annular shoulder 82 that is formed by the end portion 16 being of a slightly smaller diameter than the main portion of the cylindrical plunger rod 12. A detente 84 is provided which fits into an opening 85 on the bottom side of the end portion 16 below the slot 18. The detente 84 has a conical upper end portion 86 and a bottom end 88 that may be of a hemispherical shape or at least slightly curved.

Figure 4:
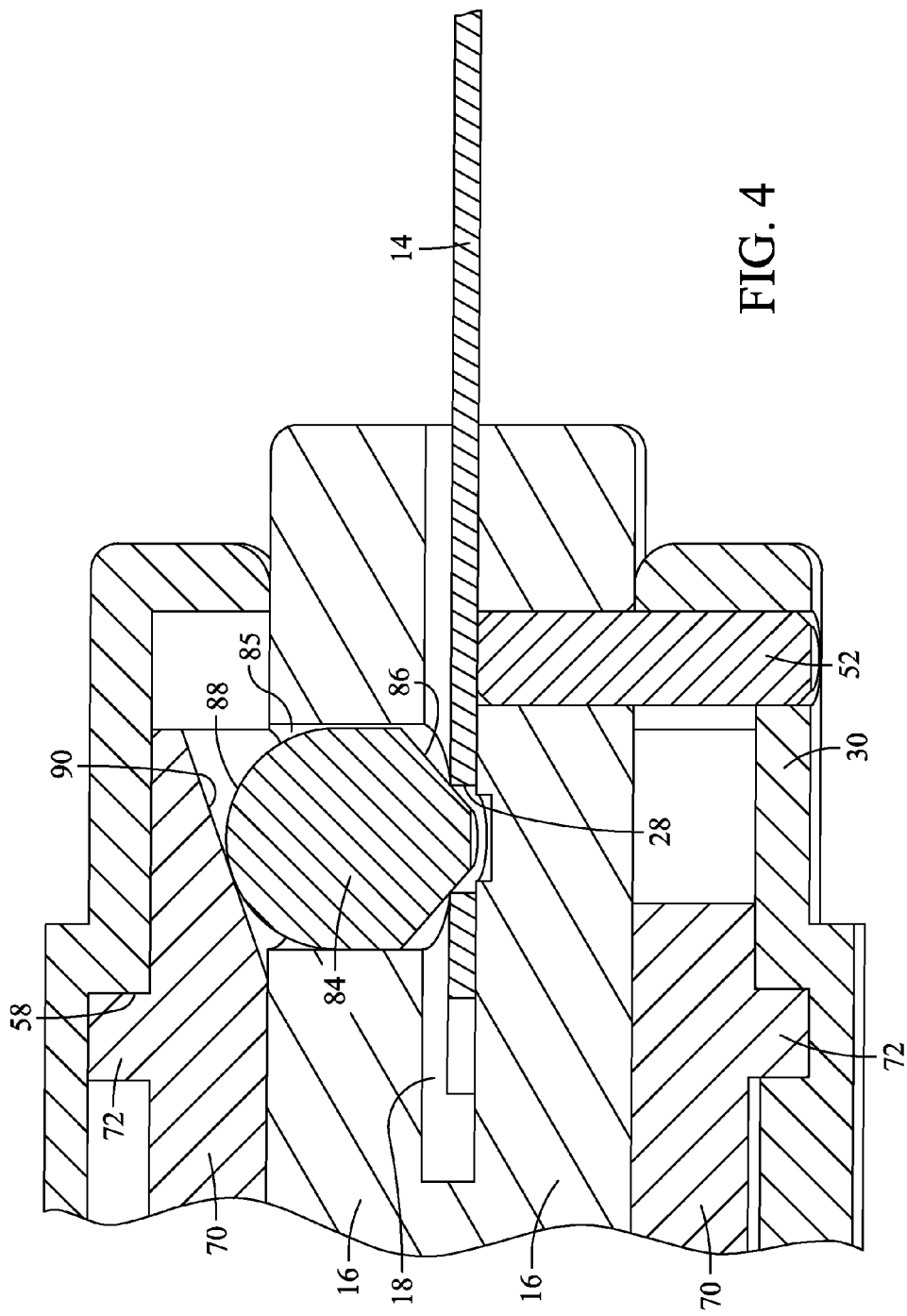
FIG. 4 is a cross-section taken generally along a line perpendicular to the orientation of the slot of the plunger rod at a location through the center of the detente.
Figure 6:
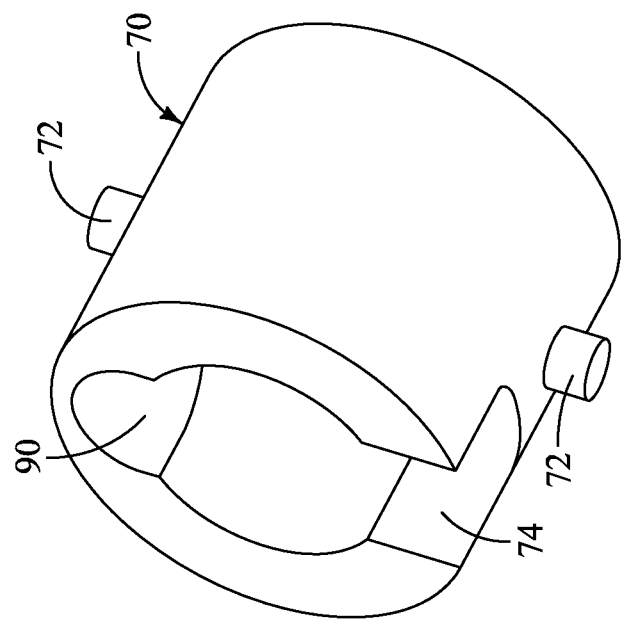
FIG. 6 is a perspective view of the inner sleeve of the apparatus shown in FIG. 1.
Figure 10:
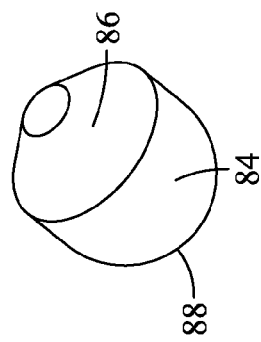
FIG. 10 is a perspective view of the detente used in the apparatus shown in FIG. 1.
Figure 9:
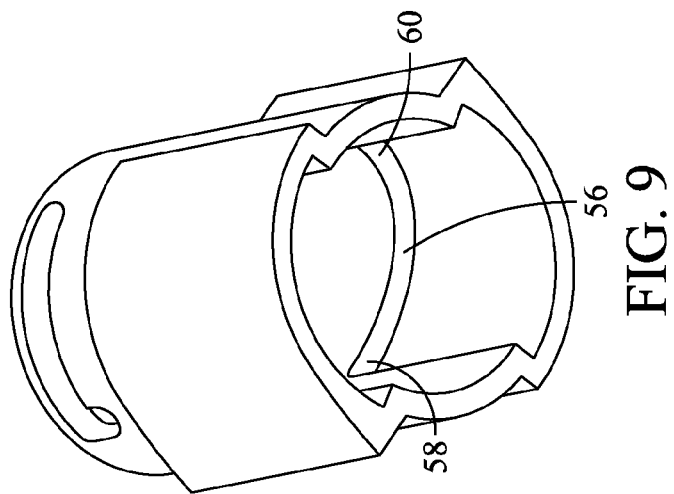
FIG. 9 is another perspective view showing the interior of the outer sleeve of the apparatus shown in FIG. 1.
Figure 8:
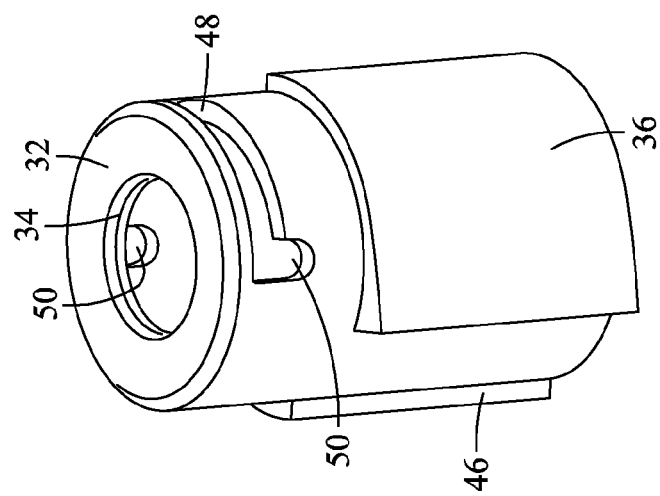
FIG. 8 is a perspective view of the outer sleeve of the apparatus shown in FIG. 1.
Figure 15:
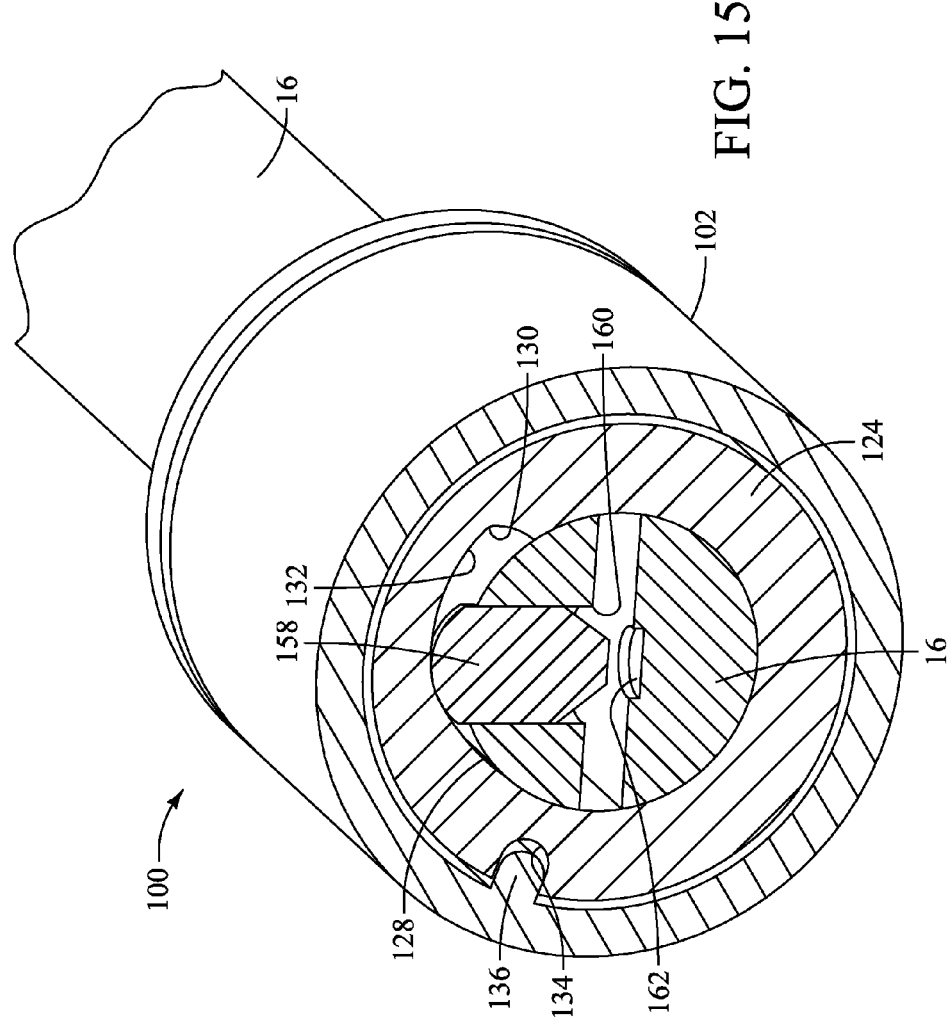
FIG. 15 is a perspective view with portions removed to reveal a cross-section taken generally along a plane transverse to the axis of the apparatus and through the center of the detente.

As best shown in FIGS. 4 and 6, the inner sleeve 70 has an inclined or ramped surface 90 that is formed in the front end of its top portion which is configured to engage the detente 84 when the apparatus is in its clamped position, i.e., when the inner sleeve 70 is at its most forward position relative to the outer sleeve 30. This occurs when the protrusion 72 is at the left end 58 as shown in FIG. 1. In this position, the inclined ramp surface 90 bears against the detente 84 and presses the conical portion 86 thereof into the opening 28 of the blade 14 to thereby firmly clamp the blade 14 so that it cannot be easily removed.

During operation of this embodiment, when a blade 14 is to be inserted into the apparatus, the apparatus is in its unclamped position which is different from the clamped position shown in FIG. 1 in that the outer sleeve 70 is rotated in the counterclockwise direction of the arrow 44 so that the pin 52 is at the opposite end or left end of the slot 48 as shown in FIG. 1. Because of the biasing force of the compression spring 78 against the inner sleeve 70, when the pin 52 is at the right end of the slot 48, the force of the spring will cause the inner sleeve to be moved forwardly or left in FIG. 1 which in turn causes the outer sleeve 30 to be moved relative to the pin so that it engages the transverse extension 50. When it reaches that point, it is in the unclamped position and it will be retained in this position until a blade is inserted into the apparatus.

To insert and clamp a blade, it is inserted into the slot 18 and opening 34 until the shoulders 22 engage the end 32 of the outer sleeve 30 at which point further inward force causes the outer sleeve to be moved rearwardly or right as shown in FIG. 1 so that the pin 52 will be aligned with the slot 48 and the force of the spring 78 will cause the protrusion 72, which at that point and time will be located on the opposite end 60 of the diagonal wall 56 and cause it to rotate the outer sleeve 30 relative to the inner sleeve 70 and thereby move it to the position as shown in FIG. 1. During that movement, the inner sleeve 70 will also move to the left or forwardly in the apparatus and cause the inclined surface 90 to engage the detent 84 and engage the hole 28 in the blade 14 to firmly secure it.

If the blade is to be subsequently removed, a user will grip the outer sleeve and rotate it counterclockwise in the direction of the arrow 44. When it reaches the position where the pin 52 is in line with the transverse extension 50, it will be quickly moved to the left which will eject the blade 14 from the apparatus.

The second preferred embodiment is similar in principle to the first in that it has an unclamped and clamped position and the apparatus is normally in an unclamped position when no blade is inserted in it and upon insertion of a blade a predetermined distance, it is released to move toward the clamped position. Similarly, when it is manually rotated toward the unclamped position, it will eject the blade when it approaches the unclamped position. Rather than moving an inclined surface in an axial direction to move the detente into the aperture in the shank of the blade 14, this preferred embodiment has a ramped or cam surface that engages the detente as a result of rotation of a clamping collar.

Turning now to the drawings, and referring to FIGS. 11-15, the clamping apparatus is indicated generally at 100 and is mounted on a plunger rod end portion 16 that is substantially similar to the rod end portion 16 of the first preferred embodiment. It also has a slot 18 as well as a flange 82 that is formed as a result of the diameter of the end portion 16 being less than the diameter of the main portion of the rod 12. The apparatus 100 has a generally cylindrically shaped hollow control sleeve, indicated generally at 102, that has a forward end portion 104 and an opening 106 that is slightly larger than the outer diameter of the end portion 16. The plunger rod also has an opening 54 in which a pin 108 is inserted and which extends outwardly so as to ride in a circumferential elongated slot 110 that has a transverse extension 112 that is directed rearwardly. The configuration of the slots 110 and the extension 112 is substantially similar to the slot and extension 48 and 50 of the first preferred embodiment.

A clamping collar 124 has a generally hollow cylindrical configuration with the outside diameter being slightly smaller than the inside diameter of the control sleeve 102 so that it fits within it. The inside surface of the clamping collar 124 is generally cylindrical in shape but has a portion 126 that has an arc of approximately 90° that increases in its radial distance from the center of the clamping collar beginning at location 128 shown in FIG. 15 and increasing to point 130 which defines a cam surface 132. The clamping collar 124 has an axial groove in its outside surface 134 configured to receive an axial rib 136 that is formed on the inside of the control sleeve 102. This interlocking rib and groove configuration causes the control sleeve 102 and clamping collar 124 to rotate together during operation of the apparatus 100.

The clamping collar also has an aperture 137 that extends substantially the full length of the clamping collar and is sized to receive a transverse end leg 138 of a torsion spring 140. An opposite leg 142 is oriented in a radial direction in the center of the spring so that it fits within the slot 18 of the plunger end portion 16. This secures the end portion 142 from rotation so that the opposite end portion 138 when inserted into the aperture 136 creates a torsional force applied to the clamping collar 124 and the control sleeve 102 if they are rotated relative to the position of the end 142.

A generally cylindrical support ring 144 has a reduced diameter forward portion 146 that defines an annular shoulder 148 that is sized to engage the rear end surface of the control sleeve 102. The support ring 144 also has a rearward extension 152 (see FIGS. 13 and 14) that fits on the end portion 16 of the plunger rod 12. A compression spring 154 bears against the support ring 144 as well as against a generally cup-shaped spring retainer 156. The inside diameter of the rear end of the spring retainer is sized to closely fit the diameter of the end portion 16 and it contacts and is held by the annular shoulder 82 of the plunger rod 12. A detente 158 is provided and fits into an aperture 160 (see FIGS. 14 and 15) in the end portion 16 of the plunger rod. In this embodiment, the axial position of the aperture 160 and the aperture 54 are different as readily shown in FIG. 14. A smaller circular recess 162 is preferable ground into the face of the slot 18 adjacent to the conical portion of the detente 158 to assure that the detente 158 will firmly engage the blade 14 when it is inserted into the apparatus. As in the first embodiment, the detente 158 engages the opening 28 of the blade shank 20.

During operation of this embodiment, when the apparatus 100 is in its unlocked position and referring to FIG. 11 (which shows the apparatus in either its clamped or unclamped position), the pin 108 will be located in the slot the extension 112. This holds the apparatus in this unclamped position. When a blade 14 is inserted into the apparatus, the shoulders 22 of the blade will engage the front end wall 104 of the control sleeve 102 and with sufficient force applied will move the control sleeve 102 in the rearward direction which will release the pin 108 from the slot extension 112 and biasing force resulting from the torsion spring 140 will rotate the control sleeve 102 as well as the clamping collar 124 in the clockwise direction as shown by arrow 164. Clockwise rotation of these two components enables the cam surface 132 of the clamping collar 124 to engage the detente 158 and move it radially inwardly to engage the hole 28 in the shank 20. When the blade moves the control sleeve 102 rearwardly, it compressed the compression spring 154 by engaging the support ring 144 and pushing it in the rearward direction.

To unlock the apparatus, a user manually rotates the control sleeve 102 in the counterclockwise direction, i.e., the direction opposite the arrow 164, which causes the cam surface 132 to release the detente 158 and when the rotation is sufficient so that the pin 108 is axially aligned with the transverse extension 112, the compression spring will force the spring support and control sleeve forwardly which causes the pin to enter the transverse slot 112 which is the unclamped position of the apparatus. The movement of the control sleeve 102 forwardly normally ejects the blade as a result of the front end wall 104 pushing the blade from the slot 18.

With regard to the third embodiment and referring to FIGS. 16-22, it is similar to the embodiment shown in FIGS. 11-15 in that the apparatus 200 has a cam surface that also engages a detente by rotation thereof. The assembled apparatus is indicated generally at 200 and is shown to be installed on a plunger rod 12 having a slightly reduced diameter end portion 16 which thereby forms the shoulder 82 as shown with regard to the prior described embodiments. The end portion 16 has a slot 18 for receiving the blade 14 which has the same configuration as has been described with regard to the first and second preferred embodiments. The apparatus 200 has a clamping collar, indicated generally at 202, that has an elongated slot 204 in which a pin 206 which is preferably force fit in an aperture 208 in the upper side of the end portion 16. Because the pin is secured in the plunger rod end portion 16 and the diameter of the pin is comparable to the width of the slot 204, the only movement that is permitted by the clamping collar 202 is rotational movement.

Figure 20:
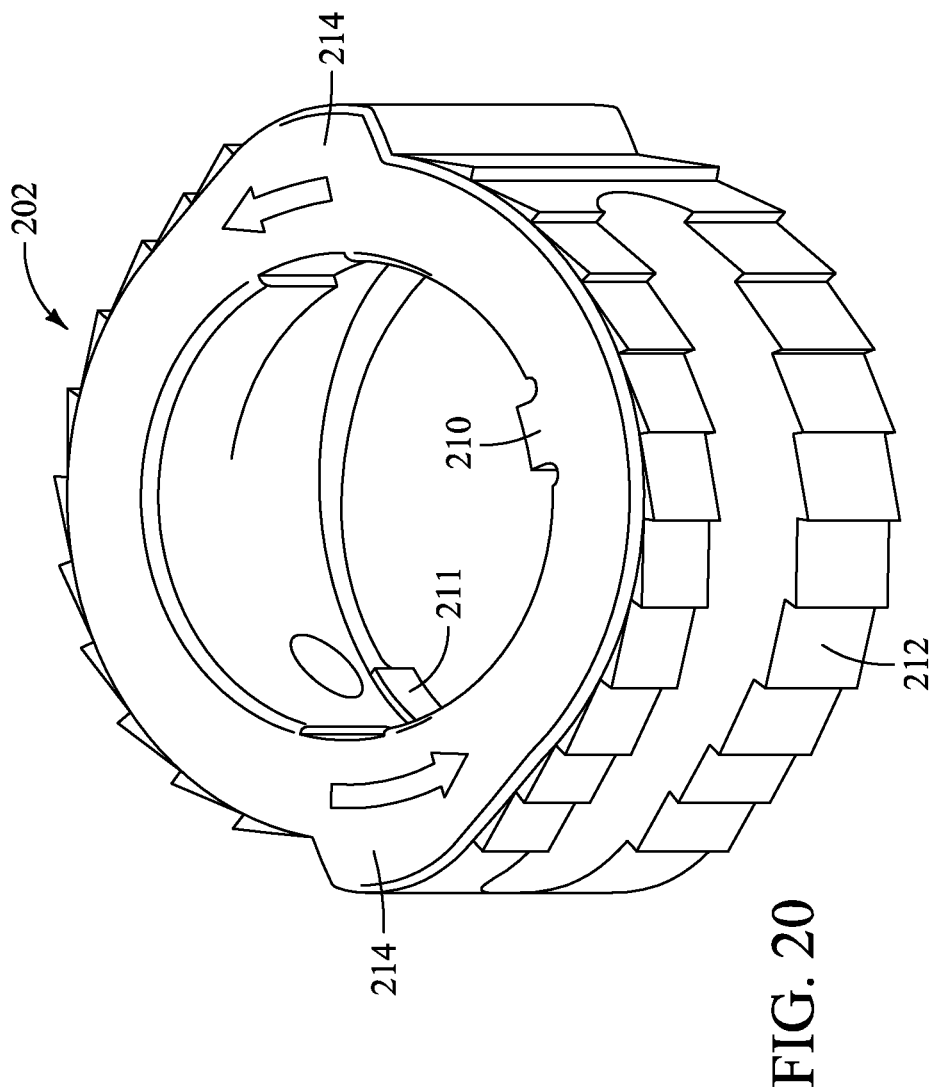
FIG. 20 is a perspective view of the clamping collar of the apparatus shown in FIG. 16.
Figure 21:
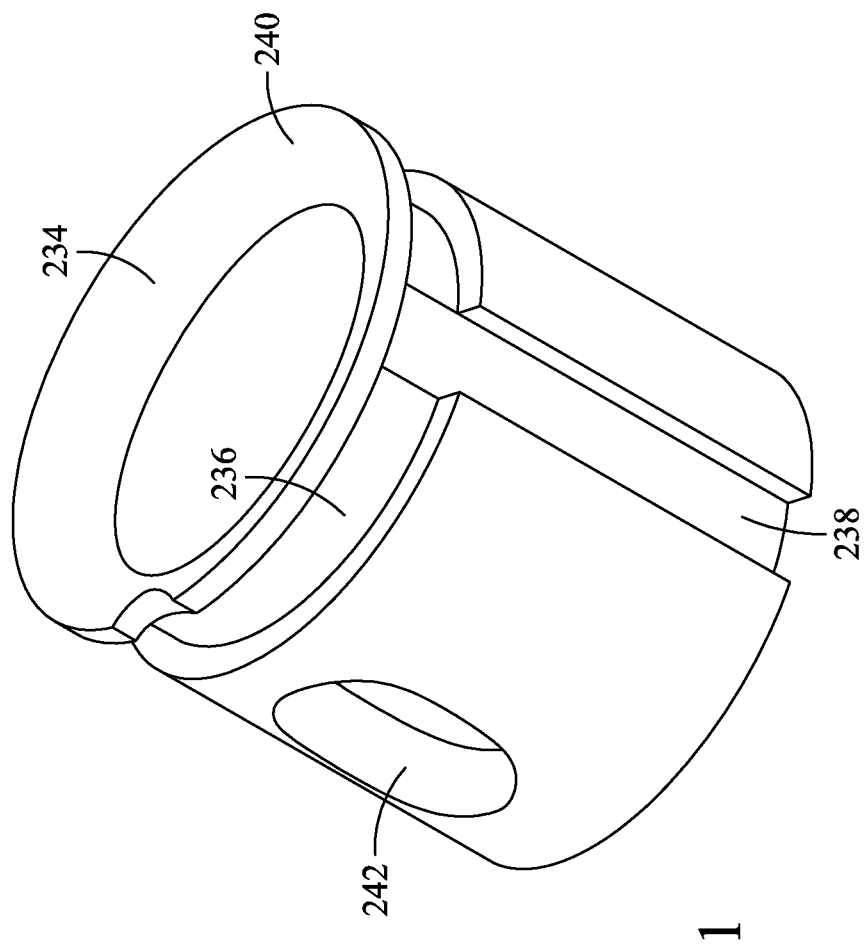
FIG. 21 is a perspective view of the control sleeve of the apparatus shown in FIG. 16.
Figure 22:
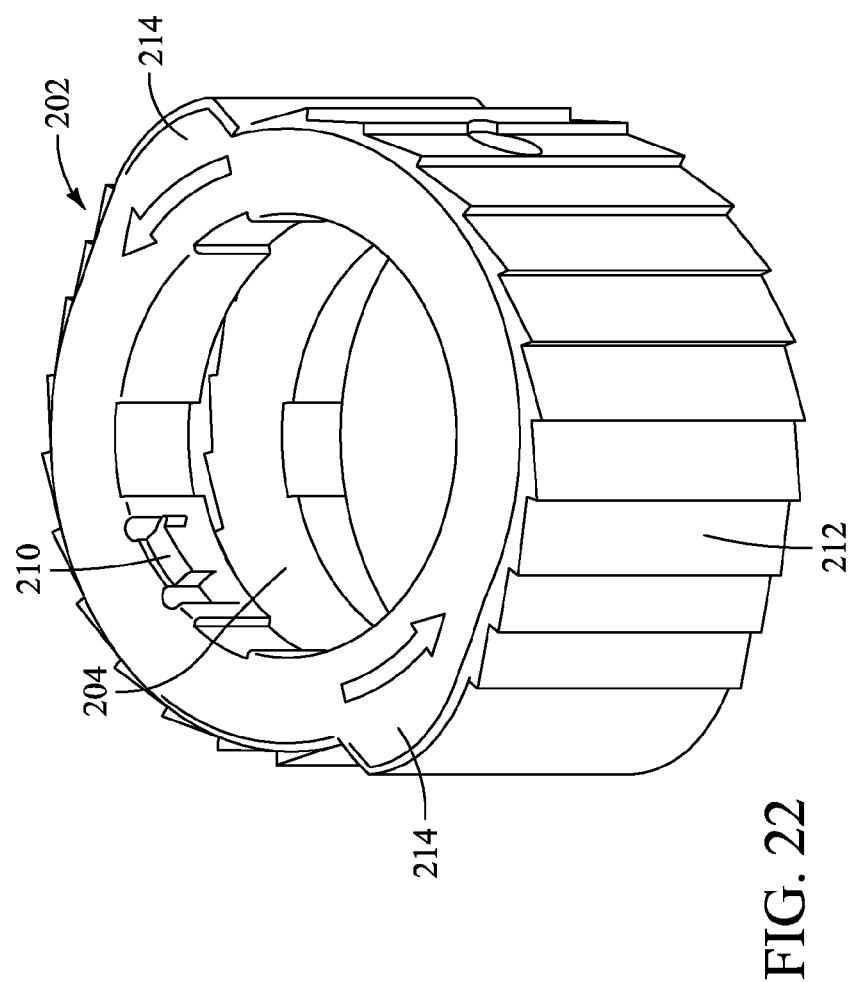
FIG. 22 is a perspective is another perspective view of the clamping collar of the apparatus shown in FIG. 16.

The clamping collar 202 has a radially inwardly directed protrusion 210 located at the front end thereof that is relatively thin and narrow as shown in FIG. 20. The clamping collar 202 also has plurality of small ramp-like protrusions 212 as well as two larger protrusions 214 which facilitate gripping by a user to rotate the clamping collar to the unclamped position as will be hereinafter explained. The clamping collar also has an axial rib 211 in the rear portion thereof for engaging a recess in a support ring 218. The rear part of the support ring 218 has an enlarged end forming a shoulder 224 that is adapted to contact the end surface of the clamping collar 202. The main part of the support ring 218 is adapted to slide within the rear portion of the clamping collar 202. By virtue of the complementary rib and recess construction, the support ring 218 and clamping collar 202 will necessarily rotate together as is desired. The support ring 218 also has an axially oriented aperture or slot 226 that is adapted to receive the transverse end 228 of a torsion spring 230, the opposite end thereof being radially oriented and configured to fit within the slot 18 of the plunger rod end 16.

A generally hollow cylindrical control sleeve 234 fits around the plunger end portion 16 and inside of the clapping collar 202. The control sleeve 234 has an annular groove 236 near the front portion 236 located near its front and the annular groove 236 merges with a perpendicular axially oriented groove 238 that extends from the annular groove 236 to the rear end of the control sleeve 234. The control sleeve 234 also has a flared front 240, the inside surface of which is generally configured to conform with the shape of shoulders of many commercially available blades 14. The control sleeve 234 also has an elongated opening 242 through which the pin 206 passes. This enables the control sleeve 234 to move in the axial direction, but is precluded from rotating relative to the plunger rod end portion 16.

A compression spring 244 is located inside of the clamping collar 202 and has a diameter that is approximately equal to that of the control sleeve 234 so that the front end of the spring 244 bears against the rear surface of the control sleeve 234 when the apparatus is assembled. The spring 244 has a diameter that is only slightly larger than the diameter of the end portion 16, and the rear end of the spring 244 bears against a spring retainer 246. The spring retainer 246 has an internal diameter that is only slightly larger than the diameter of the end portion 16 but smaller than the diameter of the main part of the plunger rod 12 so that it is restrained by the shoulder 82 of the plunger rod. A detente 248 fits within the aperture 250 in the end portion 16 of the plunger rod 12. The detente 248 also has a conical configuration at the end which engages the blade 14 and a curved opposite end portion.

Figure 19:
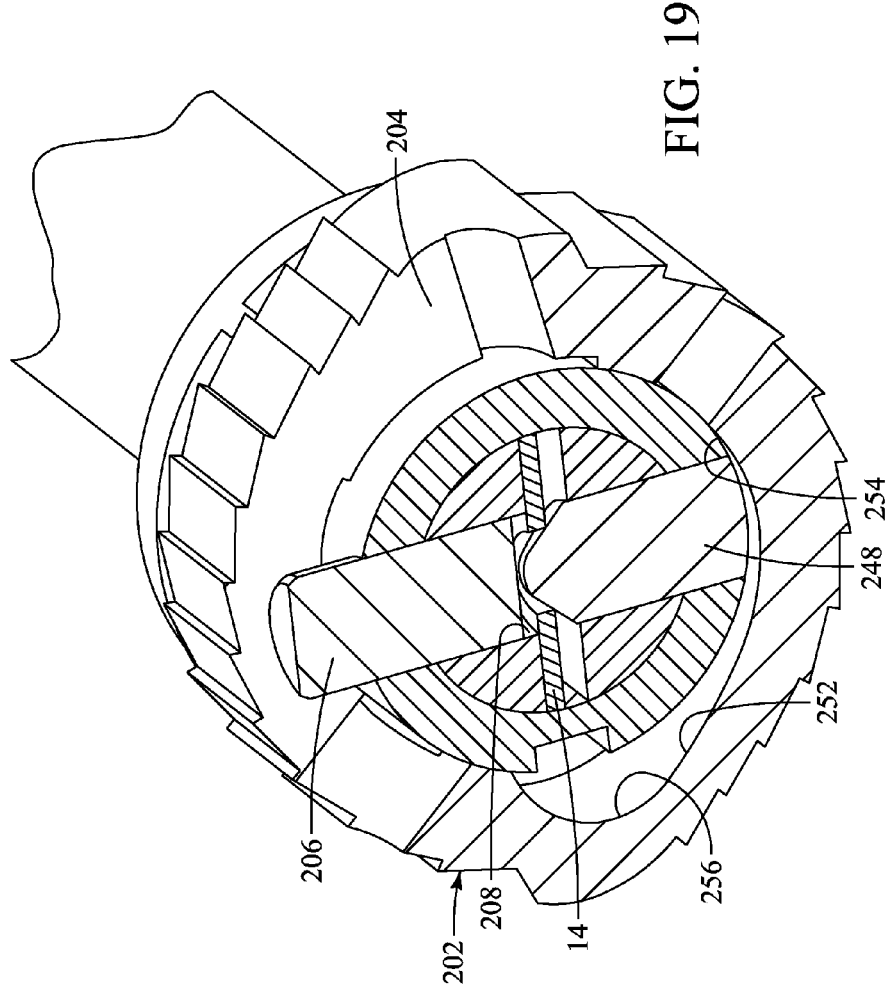
FIG. 19 is a cross-section with portions removed to illustrate a cross-section taken along a plane generally transverse to the axis of the apparatus and taken at a position to reveal the middle of the detente.

The detente 248 is moved toward and away from the blade 14 during operation by virtue of a cam surface 252 that is shown in FIG. 19 and which extends from approximately location 254 to location 256, with the location 256 having a larger radius from the center of the apparatus than the location 254. In this regard, it is similar to the cam surface of the second embodiment.

Figure 16:
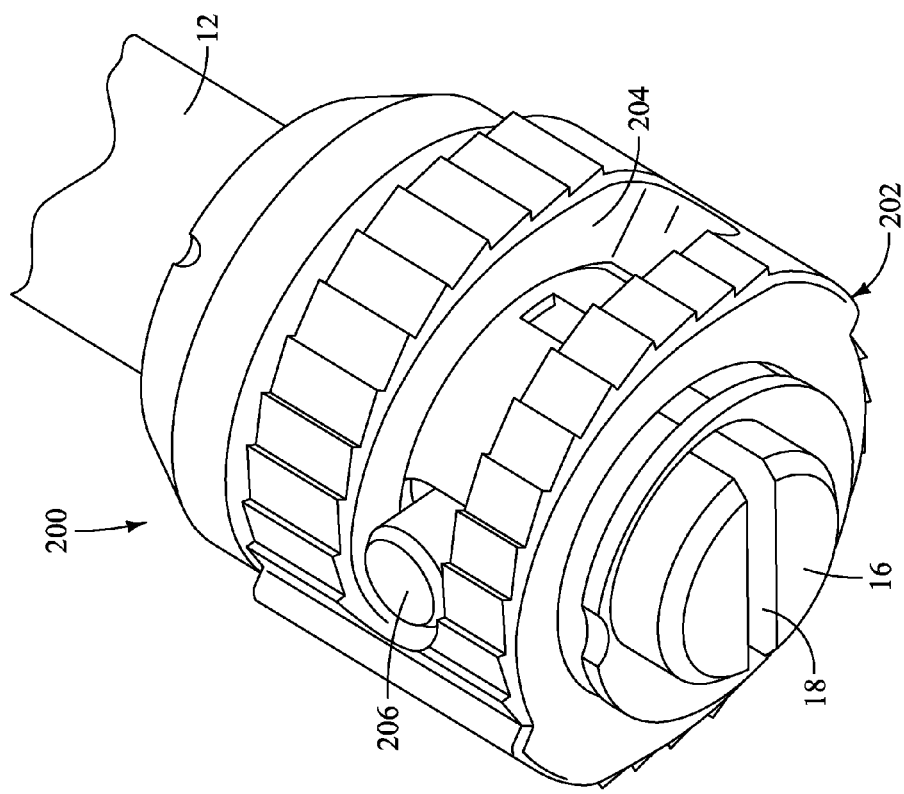
FIG. 16 is a perspective view of a third preferred embodiment of the clamping mechanism.
Figure 17:
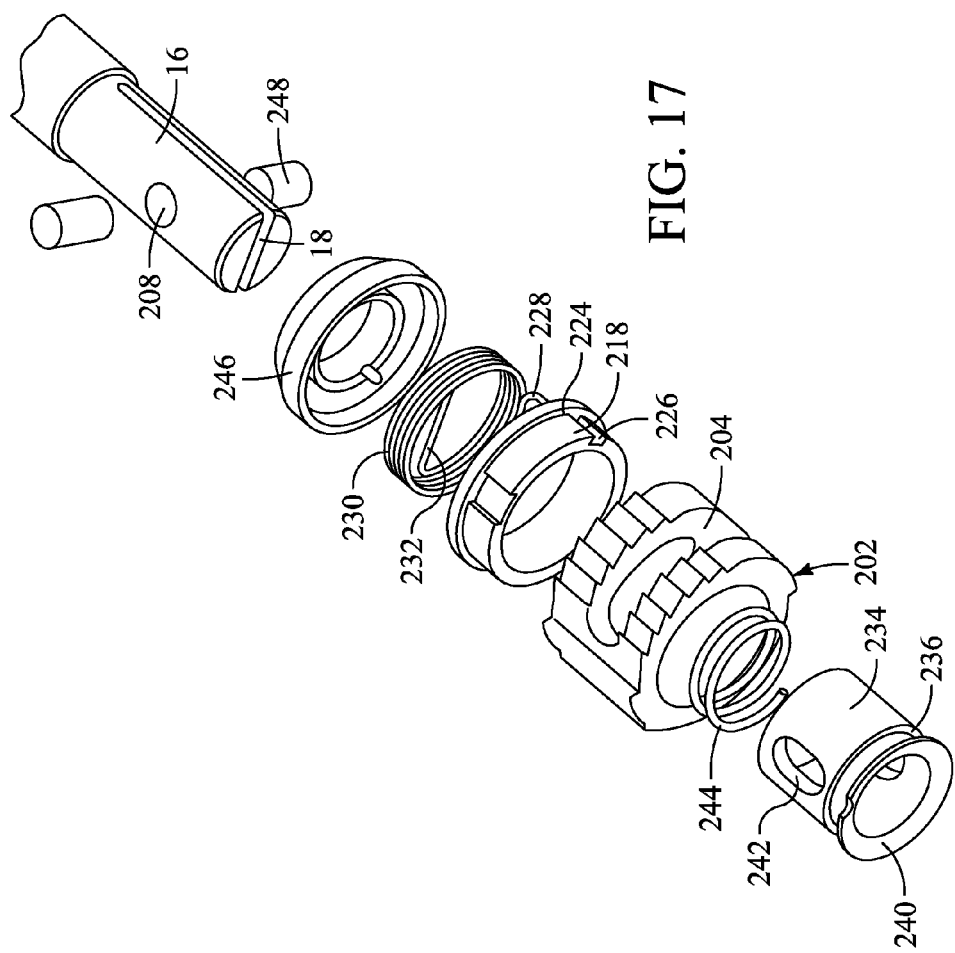
FIG. 17 is an exploded perspective view of the apparatus shown in FIG. 16.

During operation of this embodiment, when a blade 14 is inserted into the slot 18 with the apparatus 200 in its unclamped position, the protrusion 210 of the clamping collar 202 is located in the axial slot 238 of the control sleeve 234. When the blade is pressed into the apparatus with sufficient force to travel a predetermined distance, the control sleeve 234 is moved axially in the reverse direction until the protrusion 210 is aligned with the annular groove 236 of the control sleeve 234, whereupon the bias of the torsion spring 230 will rotate the support ring 218 and the clamping collar 202 so that it moves in a clockwise direction to its clamping position shown in FIG. 19. In this position, the cam surface 252 has engaged the detente 248 so that it enters the hole 28 of the shank 20. The drawing of FIG. 19 does not show a blade present, which is the reason that the conical portion of the detente 248 is extended into contact with the opening 208 in which the pin 206 is inserted. Similarly the position shown in FIG. 16 is a clamped position without a blade having been inserted. If a blade were inserted, the pin 206 would be located approximately midway between the ends of the slot 204, the exact position being a function of the thickness of the blade having been inserted.

Figure 18:
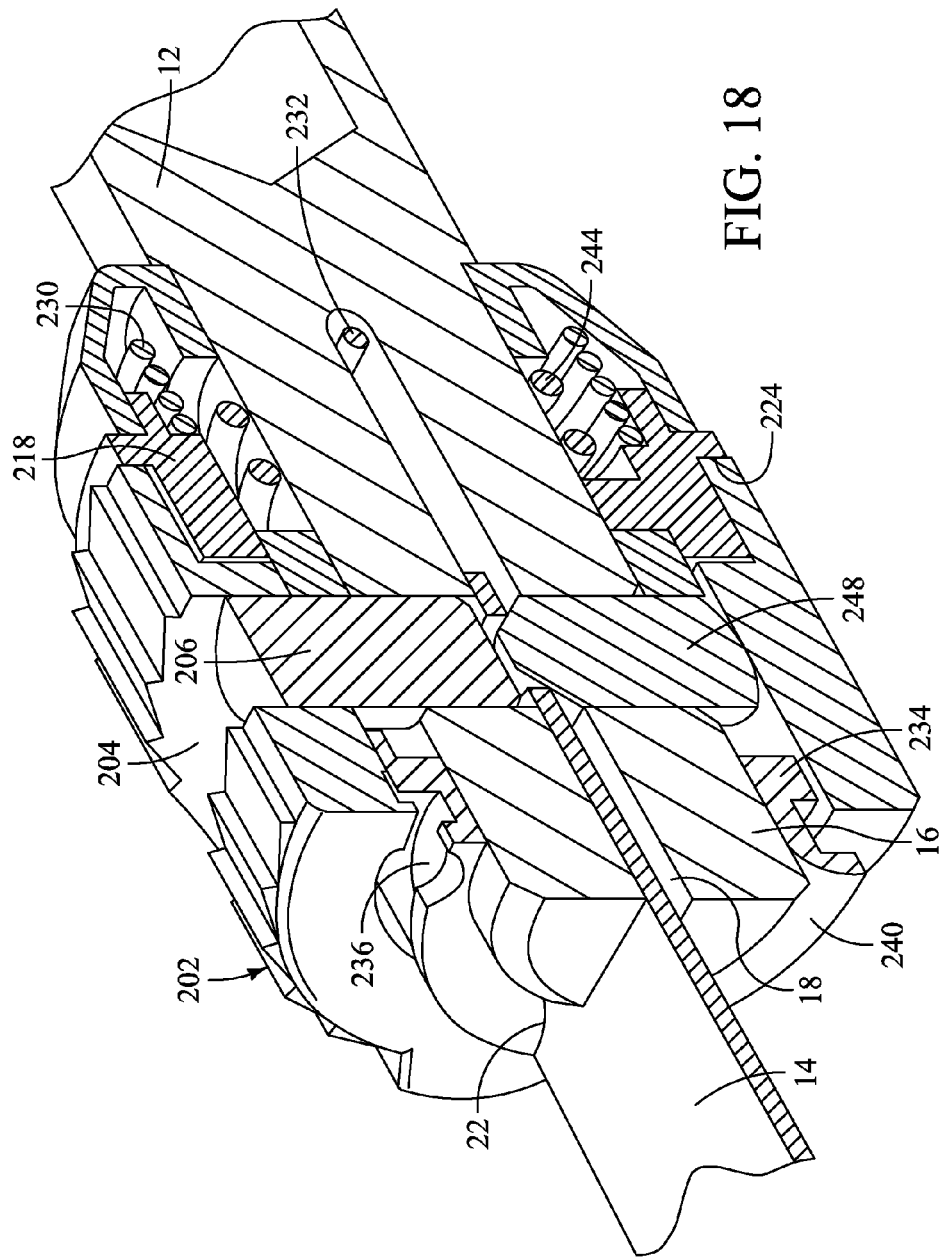
FIG. 18 is a perspective view of the apparatus shown in FIG. 1 with portions removed to illustrate the relationship of components of the apparatus shown in FIG. 16.

It should be appreciated that all embodiments of the present invention are adapted to apply a generally uniform holding force regardless of the thickness of the blade or other tool accessory that is installed in the apparatus. When the control sleeve 234 is pushed rearwardly to release the clamping collar, it loads the compression spring 244. Also, the torsion spring 230 causes the clamping collar and support ring to rotate to the position as shown in FIG. 19 where the blade would be locked in place. To unclamp the blade, the user merely needs to rotate the clamping collar in the counterclockwise direction as shown in FIGS. 16, 18 and 19, which will enable the detente 248 to be released from the blade. When the clamping collar 202 is rotated to a point where the protrusion 210 is aligned with the axial slot 238, the force of the compression spring on the control sleeve 234 will push it forwardly and normally eject the blade 14 from the apparatus.

In the event that the various embodiments of the present invention are installed on power tools that experience excessive forces during operation, the materials from which the present apparatus are made is preferably steel or other hard metal, with the exception that the spring retainers do not normally experience excessive stresses and therefore may be fabricated from plastic or plastic-like material.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A tool-less blade clamping apparatus for a reciprocating tool of the type which has a reciprocating plunger with at least one radially oriented aperture and a blade receiving slot at a forward end for receiving a blade of the type which has a shank portion with a hole and outwardly extending shoulders on opposite sides thereof between a distal end of the shank and a blade portion, the shank being configured to be inserted in the slot, the apparatus being configured to be attached to the plunger and having an opening for receiving the blade shank therein and in the slot, said apparatus comprising:

an inner sleeve partially surrounding and axially fixed to the forward end of the plunger; and an outer sleeve positioned concentrically outside the inner sleeve and being axially movable in relation to the inner sleeve and the plunger, wherein the clamping apparatus has a clamped position, in which the blade is securely retained in the clamping apparatus, and an unclamped position, in which the clamping apparatus is configured to receive the blade, wherein, in the unclamped position, the clamping apparatus is locked in position so as to remain in the unclamped position without application of an external force, wherein, during insertion of the blade into the clamping apparatus, the blade shoulders engage the outer sleeve to push the outer sleeve axially in a rearward direction, away from the forward end of the plunger, to release the apparatus from the unclamped position, wherein the clamping apparatus is biased such that, once released from the unclamped position, the clamping apparatus moves to the clamped position to securely retain the blade in the clamping apparatus, and wherein, the outer sleeve is configured to be rotated in a first rotational direction to move the clamping apparatus from the clamped position to the unclamped position, and movement of the apparatus from the clamped position to the unclamped position results in the outer sleeve moving axially in a forward direction to engage the shoulders of the blade and move the blade in the forward direction to eject the blade from the clamping apparatus.

2. The clamping apparatus of claim 1, further comprising:
the outer sleeve defining a circumferentially elongated slot; and
a pin fixed to the plunger and extending radially outwardly into the circumferentially elongated slot in the outer sleeve.

3. The clamping apparatus of claim 2, wherein:
the circumferentially elongated slot has a first end and a second end, and the second end of the circumferentially elongated slot includes an extension defined in the outer sleeve extending axially in the rearward direction, and
in the unclamped position, the pin rests in the extension of the circumferentially elongated slot to rotationally couple the outer sleeve to the plunger and lock the clamping apparatus in the unclamped position.

4. The clamping apparatus of claim 3, wherein:
during insertion of the blade into the clamping apparatus, the blade shoulders engage the outer sleeve resulting in the outer sleeve moving axially in the rearward direction with respect to the plunger to release the pin from the extension into a circumferential portion of the circumferentially elongated slot, and
once the pin is released into the circumferential portion of the circumferentially elongated slot, the outer sleeve is biased to rotate in a second opposite rotational direction until the pin is positioned at the first end of the circumferentially elongated slot, at which point the clamping apparatus is in the clamped position.

5. The clamping apparatus of claim 4, wherein:
the outer sleeve includes a diagonal wall defined in an interior surface of the outer sleeve, the diagonal wall being axially spaced apart from the first end of the circumferentially elongated slot by a first distance and being axially spaced apart from the second end of the circumferentially elongated slot by a second distance, which is greater than the first distance, and
the inner sleeve includes a protrusion extending radially outwardly from the inner sleeve to engage the diagonal wall in the outer sleeve, the engagement of the protrusion and the diagonal wall defining a radial and axial position of the outer sleeve relative to the inner sleeve.

6. The clamping apparatus of claim 5, further comprising:
a spring exerting a force on the inner sleeve to bias the protrusion into engagement with the diagonal wall,
wherein, once the pin is released into the circumferential portion of the circumferentially elongated slot, the spring urges the protrusion axially against the diagonal wall such that the outer sleeve rotates in the second rotational direction toward the clamped position.

7. The clamping apparatus of claim 6, wherein rotation of the outer sleeve in the first rotational direction urges the diagonal wall against the protrusion resulting in the outer sleeve moving axially in the forward direction to engage the shoulders of the blade and eject the blade from the clamping apparatus.

8. The clamping apparatus of claim 4 further comprising:
a torsion spring fixed at one end to the plunger and rotationally fixed at an opposite end to the inner sleeve, the torsion spring configured to rotationally bias the inner sleeve in the second rotational direction,
wherein the inner sleeve is rotationally fixed to the outer sleeve such that once the pin is released into the circumferential portion of the circumferentially elongated slot, the torsion spring urges the outer sleeve to rotate in the second rotational direction toward the clamped position.

9. The clamping apparatus of claim 8, further comprising:
a compression spring resting against the outer sleeve to bias the outer sleeve axially in the forward direction so that when the outer sleeve is positioned such that the pin is at the second end of the circumferentially elongated slot, the compression spring moves the outer sleeve in the forward direction such that the extension engages the pin and the outer sleeve engages the shoulders of the blade to move the blade in the forward direction to eject the blade from the clamping apparatus.

10. A tool-less blade clamping apparatus for a reciprocating tool of the type which has a reciprocating plunger with at least one radially oriented aperture and a blade receiving slot at a forward end for receiving a blade of the type which has a shank portion with a hole and outwardly extending shoulders on opposite sides thereof between a distal end of the shank and a blade portion, the shank being configured to be inserted in the slot, the apparatus being configured to be attached to the plunger and having an opening for receiving the blade shank therein and in the slot, said apparatus comprising:
an inner sleeve partially surrounding and rotationally fixed to the forward end of the plunger and axially movable in relation to the plunger; and
an outer sleeve positioned concentrically outside the inner sleeve;
wherein the clamping apparatus has a clamped position, in which the blade is securely retained in the clamping apparatus, and an unclamped position, in which the clamping apparatus is configured to receive the blade,
wherein, in the unclamped position, the clamping apparatus is locked in position so as to remain in the unclamped position without application of an external force,
wherein, during insertion of the blade into the clamping apparatus, the blade shoulders engage the inner sleeve resulting in the inner sleeve moving axially in a rearward direction with respect to the plunger and the outer sleeve to release the apparatus from the unclamped position,
wherein, the clamping apparatus is biased such that once released from the unclamped position, the clamping apparatus moves to the clamped position to securely retain the blade in the clamping apparatus, and
wherein the outer sleeve is rotated in a first rotational direction to move the clamping apparatus from the clamped position to the unclamped position, and movement of the apparatus from the clamped position to the unclamped position results in the inner sleeve moving axially in a forward direction to engage the shoulders and move the blade in the forward direction to eject the blade from the clamping apparatus.

11. The clamping apparatus of claim 10, further comprising:
the outer sleeve defining a circumferentially elongated slot; and
a pin fixed to the plunger and extending into the circumferentially elongated slot in the outer sleeve.

12. The clamping apparatus of claim 11, wherein:
the inner sleeve defines an annular groove and an axial slot which opens into the annular groove,
the outer sleeve includes a protrusion extending inwardly to engage one of the axial slot and the annular groove of the inner sleeve,
in the unclamped position, the protrusion engages the axial slot to rotationally couple the inner sleeve and the outer sleeve and lock the clamping apparatus in the unclamped position, and
axial movement of the inner sleeve in a rearward direction releases the protrusion from the axial slot into the annular groove, axially fixing the inner sleeve with respect to the outer sleeve and rotationally uncoupling the outer sleeve and the inner sleeve.

13. The clamping apparatus of claim 12, further comprising:
a support ring rotationally fixed to the outer sleeve and positioned in axial engagement with a rear end portion of the outer sleeve; and
a torsion spring engaging the support ring such that once the protrusion releases from the axial slot into the annular groove, the torsion spring biases the support ring and the outer sleeve in a second opposite rotational direction until the first end of the circumferentially elongated slot engages the pin and the clamping apparatus is in the clamping position.

14. The clamping apparatus of claim 13, further comprising:
a compression spring configured to bias the support ring and the outer sleeve axially in the forward direction,
wherein the axial slot has a first slot end, where the axial slot opens into the annular groove, and a second opposite slot end, and
wherein the outer sleeve is configured to be rotated from the clamping position in the first rotational direction until the protrusion is positioned at the first slot end of the axial slot and the pin is positioned at the first end of the circumferentially elongated slot, at which point the compression spring urges the inner sleeve in the forward direction to (i) slide the axial slot past the protrusion until the protrusion is at the second slot end of the axial slot and (ii) engage the inner sleeve with the shoulders of the blade to move the blade in the forward direction and eject the blade from the clamping apparatus.

* * * * *